(12) United States Patent
Ukrainczyk (10) Patent No.: US 6,253,015 B1
(45) Date of Patent: Jun. 26, 2001

(54) PLANAR WAVEGUIDES WITH HIGH REFRACTIVE INDEX

(75) Inventor: Ljerka Ukrainczyk, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/499,954

(22) Filed: Feb. 8, 2000

(51) Int. Cl.⁷ .................................................. G02B 6/10
(52) U.S. Cl. ............................................ 385/130; 385/129
(58) Field of Search .................................... 385/129, 130, 385/131, 132, 43

(56) References Cited

U.S. PATENT DOCUMENTS

| | | | |
|---|---|---|---|
| 5,933,562 | * 8/1999 | Dutting et al. | 385/131 |
| 6,003,222 | 12/1999 | Barbarossa | 29/600 |
| 6,181,722 | * 1/2001 | Dutting et al. | 385/131 X |

OTHER PUBLICATIONS

P. K. Tien, "Integrated optics and new wave phenomena in optical waveguides," *Reviews of Modern Physics*, vol. 49, No. 2, Apr. 1977, pp. 361–420.

X Orignac, R. M. Almeida, "Silica–based sol–gel optical waveguides on silicon," *IEE Proc.–Optoelectron.*, vol. 143, No. 5, Oct. 1996, pp. 287–292.

H. Kogelnik, V. Ramaswamy, "Scaling Rules for Thin–Film Optical Waveguides," *Applied Optics*, vol. 13, No. 8, Aug. 1974, pp. 1857–1862.

K. V. Avudainayagam, A. Selvarajan, "Strip–loaded waveguide using an underlay," *Optics Letters*, vol. 12, No. 6, Jun. 1987, pp. 443–444.

* cited by examiner

Primary Examiner—Phan T. H. Palmer
(74) Attorney, Agent, or Firm—Price, Heneveld, Cooper, DeWitt & Litton (57) ABSTRACT

A planar optical component having a relatively high refractive index waveguide that is capable of being coupled to a standard optical fiber or other standard optical waveguide having a relatively low refractive index waveguide exhibits reduced loss of signal as compared with conventional planar optical components having a high refractive index waveguides. The component includes a waveguide which includes a first waveguide segment having a core material with a first refractive index, a second waveguide segment having a core material with a second refractive index, and a transition waveguide segment between the first and second waveguide segments. The transition waveguide segment includes a core material with the first refractive index and a core material with the second refractive index. The first and second core materials have an interface that is sloped or tapered at an acute angle relative to the direction that the light is propagated through the waveguide to reduce reflective losses between the core materials having different refractive indices. The first waveguide segment can be fabricated to have geometric and optical properties that closely match those of a standard optical fiber, thereby reducing loss of signal at the interface between an optical fiber and the component.

26 Claims, 5 Drawing Sheets

PLANAR WAVEGUIDES WITH HIGH REFRACTIVE INDEX

BACKGROUND OF THE INVENTION

1. Field of the Invention

The present invention relates generally to planar optical components used for optical communications, and more particularly to planar optical components employing a waveguide having a core with a relatively high refractive index and/or a waveguide defined by a core and a surrounding cladding in which the difference between the refractive index of the core and the refractive index of the cladding is relatively high.

2. Technical Background

Planar optical components having a waveguide core with a refractive index considerably higher than the surrounding cladding are known. These components comprise a planar substrate onto which an undercladding layer is disposed or a planar substrate which itself acts as an undercladding layer, a patterned core material disposed on the undercladding layer that defines an optical waveguide circuit, and, optionally, an overcladding layer which, together with the undercladding layer, surround the patterned core. An example of a planar optical component having a waveguide defined by a patterned core material having a relatively high refractive index is a photo-optical switch. Due to the relatively high refractive index of the core material in such components, the cross-sectional dimensions (i.e., width and height) of the core are typically much lower than the cross-sectional dimensions of a typical core material having a refractive index, such as about 1.4. In general, the reduced cross-sectional dimensions are necessary to maintain single-mode light propagation through the waveguide since multi-mode propagation associated with larger cross-sectional dimensions results in unacceptable losses of light intensity (i.e., loss of signal and a decrease in the signal-to-noise ratio).

Known planar optical components employing a core material having a relatively high refractive index, and/or a relatively high difference between the refractive index of the core and the refractive index of the surrounding cladding, even when properly constructed to prevent multi-mode light propagation, exhibit relatively high losses of signal strength, as compared with typical waveguides defined by a core having a relatively lower index of refraction, relatively larger cross-sectional dimensions, and a relatively high difference between the refractive index of the core and the refractive index of the cladding. This results since light waves propagated through a waveguide defined by a core material having a relatively high refractive index strike the interface between the core and the cladding more frequently as compared to a typical waveguide defined by a core material having a relatively lower refractive index. Whenever light strikes an interface between the core and the cladding of the waveguide, light may be scattered due to defects at the interface. The higher frequency at which the light strikes the interface between the core and the cladding therefore results in more light being scattered at defects at the interface, and higher losses of signal strength in optical components having a core with a relatively high refractive index and/or a relatively high difference in the refractive index of the core and the refractive index of the cladding.

In addition to the disadvantages associated with higher losses of signal strength in the known planar optical components that include a core having a relatively high refractive index and/or a relatively high difference between the refractive index of the core and the refractive index of the cladding, there are additional losses associated with coupling light into the component from a typical waveguide, such as a standard optical fiber having a cross-sectional dimension (diameter) that is much larger than the cross-sectional dimensions of the high refractive index core material of a planar optical component. Typically, an optical fiber is connected to the input side of a waveguide of a planar optical component by abutting a surface at an end of the optical fiber with a surface at the end of the optical component, and adhering the end of the optical fiber to the optical component. The abutting surfaces are substantially perpendicular to the optical path through the optical fiber and through the waveguide of the planar optical component so that the core of the optical fiber is aligned with the core of the planar optical component as closely as is possible to maximize core-to-core interfacial area, and minimize losses at the interface between the optical fiber and the planar optical component. However, due to the relatively large differences between the cross-sectional dimensions of the core of a typical optical fiber and the cross-sectional dimensions of the core of a typical optical component having a high refractive index core, losses are relatively high at the interface between the optical fiber and the planar optical component. Another contributing factor to the high losses at the interface between the optical fiber and the planar optical component is due to light being reflected at the interface because of the relatively large difference between the refractive index of the core of the optical fiber and the refractive index of the core of the planar optical component.

SUMMARY OF THE INVENTION

The invention pertains to a planar optical component having a waveguide including a patterned core and at least an undercladding on which the patterned core is disposed, in which the core material has a relatively high refractive index and/or the difference between the refractive index of the core and the refractive index of the cladding is relatively high; and in which optical signal losses in the component and at the interface between an optical fiber and an optical input on the planar optical component are lower than the corresponding losses in conventional planar optical components having a core with a relatively high refractive index. The improvements are achieved with a planar optical component having a waveguide segment with a core having a cross-sectional dimension and a refractive index closely matched to a cross-sectional dimension and refractive index of the core of a typical optical fiber, a second region having a core with a relatively high refractive index and an appropriately smaller cross-sectional dimension than the core of the first segment to prevent multi-mode wave propagation; and a transition segment having a core comprised of two different materials which form an interface extending the length of the transition segment.

In accordance with an aspect of the invention, a planar optical component comprises a waveguide including a first waveguide segment having a core material with a first refractive index, a second waveguide segment having a core material with a second refractive index, and a transition waveguide segment between the first and second waveguide segments. The transition waveguide segment includes a core material with the first refractive index and a core material with the second refractive index, the first and second core materials include an interface sloped at an acute angle relative to the direction light propagated through the waveguide.

In accordance with another aspect of the invention, a planar optical component comprises a waveguide including a first segment having a first core material with a refractive index that is about 1.5 or less, a second segment having a second core material with a refractive index that is greater than about 1.5, and a transition segment disposed between the first and second segments. The transition segment includes a core defined by both the first core material and the second core material. The first core material in the transition segment is contiguous with the first core material in the first segment, and has a cross-sectional dimension that decreases in a direction from the first segment toward the second segment. The second core material in the transition segment is contiguous with the second core material in the second segment, and has a cross-sectional dimension that decreases in a direction from the second segment toward the first segment. The first and second core materials in the transition segment interface throughout the length of the transition segment.

In accordance with a further aspect of the invention, a planar optical component comprises a waveguide including a first segment having a core and a cladding in which the difference between the refractive index of the core and the refractive index of the cladding is from about 0.2% to about 2%, a second segment having a core and a cladding in which the difference between the refractive index of the core and the refractive index of the cladding is greater than about 2%, and a transition segment disposed between the first and second segments. The transition segment includes a core defined by a contiguous mass of a first material and a contiguous mass of a second material, and a cladding, in which the difference between the refractive index of the first material and the cladding is from about 0.2% to about 2%, and the difference between the refractive index of the second material and the refractive index of the cladding is greater than about 2%. The first and second contiguous masses interface extending the length of the transition segment. The first mass is contiguous with the core of the first waveguide segment and has a cross-sectional dimension that decreases in a direction from the first waveguide segment toward the second waveguide segment. The second mass is contiguous with the core of the second waveguide segment, and has a cross-sectional dimension that increases in a direction from the first waveguide segment toward the second waveguide segment.

The planar optical components of this invention facilitate coupling of typical optical fibers having a core with a relatively low refractive index and a relatively low difference between the refractive index of the core and the cladding to a planar optical waveguide having a core with a relatively high refractive index and/or a relatively high difference between the refractive index of the core and the cladding. In particular, the planar optical components of this invention exhibit very low insertion losses at the interface between an optical fiber and a first waveguide segment by matching the dimensions of the core of the first waveguide segment to the dimensions of the core of a standard optical fiber, and by providing a transition waveguide segment having tapered high and low refractive index cores which reduce reflection losses at the interface between the high and low refractive index cores.

Additional features and advantages of the invention will be set forth in the detailed description which follows, and will be apparent to those skilled in the art from the description or recognized by practicing the invention as described in the description which follows, together with the claims and appended drawings.

It is to be understood that the foregoing description is exemplary of the invention only, and is intended to provide an overview for the understanding of the nature and character of the invention as it is defined by the claims. The accompanying drawings are included to provide a further understanding of the invention, and are incorporated into and constitute part of the specification. The drawings illustrate various features and embodiments of the invention which, together with their description, serve to explain the principles and operation of the invention.

DETAILED DESCRIPTION OF THE PREFERRED EMBODIMENTS

Figure 1:
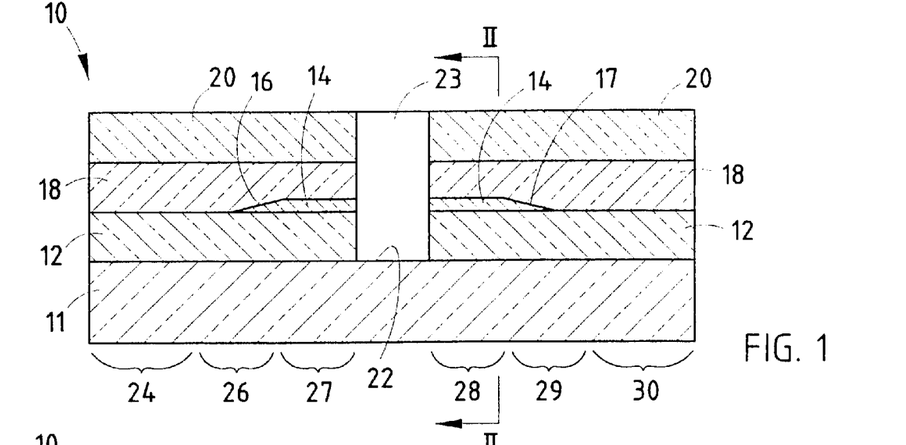
FIG. 1 is a schematic vertical cross-sectional view of a planar optical component embodying the invention.
Figure 2:
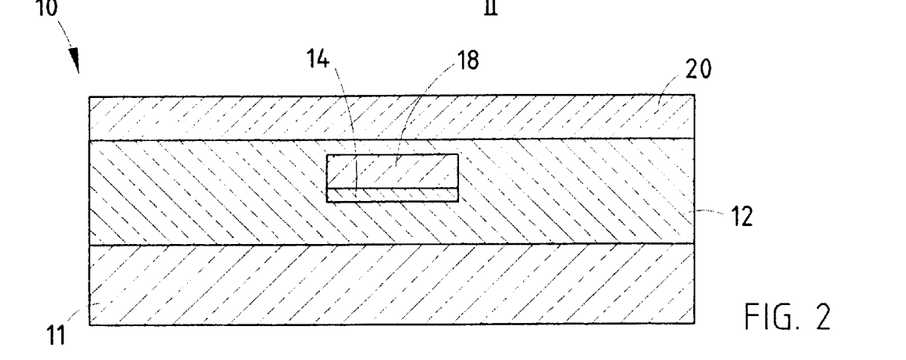
FIG. 2 is a schematic cross-sectional view of the component shown in FIG. 1 taken along section lines II—II of FIG. 1.

A liquid crystal cross-connect switch 10 embodying an aspect of this invention is shown in FIGS. 1 and 2. Switch 10 is a planar optical component comprising a substrate 11 on which is disposed a cladding layer 12. Disposed over cladding layer 12 is a patterned core layer 14 having a relatively high refractive index as compared with a standard optical fiber or other standard waveguide. Core layer 14 has tapered or sloped edges 16, 17 whereby the thickness of core layer 14 changes along the length of a waveguide defined by core layer 14 and cladding layer 12. Disposed over patterned core layer 14 and areas of cladding layer 12 which are not covered by core layer 14 is a second patterned core layer 18 having a relatively low refractive index as compared with the refractive index of patterned core layer 14. Disposed over second patterned core layer 18 is an overcladding layer 20.

Layers 12, 14, 18 and 20 are separated by a trench 22 that is filled with a liquid crystal material 23 to form a liquid crystal cross-connect switch. Switch 10 includes an input waveguide segment 24 defined by second patterned core layer 18 and cladding layers 12 and 20, a first transition segment 26 in which light propagated through low refractive index core layer 18 enters high refractive index core layer 14, a first high index waveguide segment 27 which transmits light into the liquid crystal material 23, trench 22 filled with liquid crystal material 23, a second high-index waveguide segment in which light propagated through liquid crystal material 23 is collected, a second transition segment 29 in which light propagated through high refractive index core layer 14 of the second transition segment 28 enters low refractive index core 14, and an output waveguide segment 30 defined by core layer 18 and cladding layers 12 and 20.

Input waveguide segment 24 and output waveguide segment 30 have a core 18 with cross-sectional dimensions and refractive indices that are closely matched to the core dimensions and the refractive index of a standard optical fiber or other waveguide. Additionally, cladding layers 14 and 20 desirably have a thickness that is at least equal to the radial thickness of the cladding of a standard optical fiber, and a refractive index that is closely matched to the refractive index of the cladding of a standard optical fiber or other typical optical waveguide. By matching the geometric and optical properties of the input waveguide segment 24 and the output waveguide segment 30 to the geometric and optical properties of a standard optical fiber or other typical optical waveguide such as a planar waveguide on another optical component, it is possible to achieve lower optical signal losses when coupling component 10 (which includes a waveguide section having a core with a relatively high refractive index and a high difference between the refractive index of the core and the cladding) to a standard optical fiber or other waveguide having a core with a typical refractive index (e.g., about 1.45) and a typical difference between the refractive index of the core and the refractive index of the cladding (e.g., about 0.35%).

The transition waveguide section 26 allows light to be efficiently transferred from core 18 of input segment 24 to core 14 along the tapered or sloped transitional interfaces 16 and 17 between core 18 and core 14 so that reflective losses at the interface of the core 18 and core 14 are minimized because of the relatively shallow angle at which light strikes the interface. Similarly, the transition waveguide segment 28 facilitates efficient transmission of light from core 14 to core 18 on the output side of component 10 because of the relatively shallow angle at which light strikes the sloped interface between core 18 and core 14 at transition segment 28.

In the high refractive index segments 27 and 28, the majority of light is propagated through the core layer 14 which has a refractive index that is approximately matched to the refractive index of liquid crystal material 23. Core layer 18 acts more as a cladding in high-index segments 27 and 28, although some light is propagated through the core layer 18 in these segments, especially those areas of core layer 18 of high-index segment 28 that are immediately adjacent to liquid crystal material 23. The thickness of core layer 14 in high-index segments 27 and 28 is typically about the maximum thickness that is possible without allowing multi-mode propagation of the light signal. As is well known, this thickness is dependent on the refractive indices of the core and cladding (or claddings if the overcladding is different from the undercladding) at the wavelength of the signal being propagated through the component. For component 10 illustrated in FIGS. 1 and 2, the undercladding 12 would typically have a refractive index about equal to the refractive index of the cladding of a standard optical fiber (e.g., about 1.44), core 18 would typically have a refractive index about equal to the refractive index of the core of a standard optical fiber (e.g., about 1.45), and core 14 could have a refractive index about equal to the refractive index of liquid crystal material 23 (e.g., about 1.7). Using these typical values, high-index core 14 would have a thickness of about 0.2 microns, and low-index core 18 would have a thickness of about 6 microns.

The tapered or sloped interfaces 16 and 17 between core layers 14 and 18 solve both of the major problems associated with planar optical components having a core with a relatively high refractive index. First, the sloped interfaces 16 and 17 facilitate transfer of light from a waveguide having dimensions closely matching the dimensions of typical optical fibers and other optical waveguides. In such structures, loss of signal due to abrupt changes in the cross-sectional dimensions of the low-index core of a typical optical fiber or other waveguide and the cross-sectional dimensions of the high-index waveguide of the component are replaced with a gradual transition in the dimensions of the low refractive index waveguide and the high refractive index waveguide. This results in a substantial reduction in signal loss. An additional benefit is that proper alignment of optical fibers or other waveguides with the input and output waveguide segments of the component is more easily achieved than with a conventional planar optical component having a high-index core in which the entire waveguide of the component is defined by a core material having a relatively high refractive index and relatively small cross-sectional dimensions as compared with the dimensions of a typical optical fiber. Second, the sloped or tapered interfaces 16 and 17 between low refractive index core 18 and high refractive index core 14 significantly reduce reflection losses as compared with a conventional component in which the interface between the low refractive index core of an optical fiber and the high refractive index core of the planar optical component is generally perpendicular to the direction at which light is propagated through the interface.

The illustrated liquid crystal cross-connect switch 10 demonstrates a particular application of the invention, which relates to the provision of a planar optical component having a high refractive index waveguide segment, a low refractive index waveguide segment and a transition segment in which light is efficiently transferred from the low-index waveguide segment to the high-index waveguide segment, or from the high-index waveguide segment to the low-index waveguide segment, with very low loss of signal. The liquid crystal switch comprising liquid crystal material 23 is illustrative of a particular component in which a high refractive index waveguide is useful. However, for purposes of completeness and clarity, the operation of switch 10 is briefly described. Switch 10 may be operated as an on/off switch by applying an electrical field to liquid crystal material 23. It is well known that the orientation of liquid crystals can be controlled with an electrical field, and that the refractive index of liquid crystal material 23 is dependent on the orientation of the liquid crystals. Accordingly, by appropriate selection of liquid crystal material 23 and application of an appropriate electrical field, the refractive index of material 23 can be changed to allow light to pass through material 23 or to be reflected at the interface between core material 14 and liquid crystal material 23.

An additional advantage with the design of component 10 is that light which is dispersed due to free propagation in liquid crystal material 23 is at least partially collected in core layer 18 of high-index segment 18, thereby reducing losses as compared with a conventional component consisting of only a single high-refractive index core material.

Component 10 is prepared using conventional deposition techniques and lithographic techniques. For example, undercladding layer 12 may be deposited on substrate 11 using any suitable deposition technique including physical vapor deposition (PVD) processes such as sputtering, electron beam evaporation, molecular beam epitaxy, and laser ablation, and, more preferably, chemical vapor deposition (CVD) processes including flame hydrolysis deposition (FHD), atmosphere pressure chemical vapor deposition (APCVD), low-pressure chemical vapor deposition (LPCVD), plasma-enhanced chemical vapor deposition (PECVD), and chemical beam epitaxy. For typical planar optical components, flame hydrolysis deposition (FHD) and plasma-enhanced chemical vapor deposition (PECVD) have been the most widely utilized methods because of low waveguiding propagation losses and excellent compositional and thickness uniformity. Substrate 11 may be a semiconductor, such as a mono-crystalline silicon, a ceramic or glass. The various layers of the component may also be deposited using known sol-gel deposition techniques. Waveguide core layer 14 is preferably formed using a sol-gel deposition technique because such techniques produce smoother surfaces with fewer defects that could cause surface scattering of light at the interfaces between the core and the cladding. The various layers of the device may also be deposited using known sol-gel deposition techniques. Waveguide core layer 14 is preferably formed using a sol-gel deposition technique because such techniques produce smoother surfaces with fewer defects that could cause surface scattering of light at the interfaces between the core and the cladding. However, the expression "substrate" as used in the claims is meant to encompass generally any solid material having a surface on which a layer of glass may be patterned, although a silicon substrate is generally preferred. Undercladding layer 12 may be, for example, a high-silica glass. However, other glasses, crystalline materials or ceramic materials may be used. A suitable thickness for undercladding layer 12 is from about 10 to about 20 micrometers. Undercladding layer 12 typically has a refractive index of about 1.44, although it can be somewhat higher or lower, depending on the particular application. Deposited over undercladding layer 12 is a high-refractive index core layer 14. The refractive index of core layer 14 is typically greater than 1.5, more typically from about 1.7 to 4 or 5, and can be even higher. High refractive index core layer 14 may be any suitable glass, crystalline or ceramic material which is transparent to light at the signal wavelength (e.g., 1,550 nanometers) and which has the desired high refractive index at the signal wavelength. Examples of suitable materials include silica-titania glass, silicon, and lead-lanthanum-zirconium titanate (PLZT). Core layer 14 is deposited at a thickness dependent on the refractive index of layer 14, and on the refractive index of surrounding cladding. The thickness of layer 14 will be less than the thickness of layer 18, and will typically range from about 0.1 microns to about 1 or 2 microns. Before low refractive index core layer 18 is deposited, layer 14 must be patterned, which can be achieved using known lithographic techniques. For example, layer 14 may be deposited through a mask. Tapered edges 16 and 17 are formed during physical or chemical vapor deposition of layer 14 on cladding 12 through a mask. Alternatively, patterning of layer 14 can be achieved by first depositing a layer of uniform thickness and subsequently etching away those portions of layer 14 which are not desired. This can be achieved by applying a photo-resist (either positive or negative) layer over core layer 14, curing portions of the photo-resist layer or degrading portions of the photo-resist layer by irradiating the photo-resist layer through a mask, whereby portions of the mask may be removed with a stripping material to allow etching of layer 14 into a desired pattern. During the etching process, tapered or sloped edges 16 and 17 are formed.

After layer 14 has been patterned as desired, a low-refractive index core layer 18 is deposited. Low-index core layer 18 may be comprised of generally any glass, crystalline or ceramic material that is transparent to light at the signal wavelength (e.g., 1,550 nanometers) and which has a desired low refractive index at the signal wavelength. Typically, core layer 18 has a refractive index that is from about 0.2% to about 2% higher than the refractive index of cladding layer 12, more typically from 0.2% to about 1%, and even more typically, from about 0.2% to about 0.5% (e.g., about 0.35%). Core layer 18 may be patterned using generally any of the conventional etching or deposition processes previously described for patterning core layer 14. High-index core layer 14 has a refractive index that is at least about 2% higher than the refractive index of cladding 12, more typically at least 10% higher, and which can be as much as 250% higher or more. An overcladding layer 20 may be deposited over core layer 18. As with layers 12 and 14, layers 18 and 20 may be deposited using an acceptable physical vapor deposition or chemical vapor deposition technique. Trench 22 may be created by etching layers 12, 14, 18 and 20 through a patterned photo-resist layer deposited over layer 20, mechanically created by cutting or routing trench 22, or by masking an area on the upper surface of substrate 11 that defines the bottom of trench 22, depositing layers 12 and 16, patterning layer 16, depositing layers 18 and 20, and then removing the mask from the area defining the bottom of trench 22. Thereafter, trench 22 is filled with liquid crystal material 23 and conventional electrical contacts (not shown) are provided for subjecting liquid crystal material 23 to an electrical field.

Figure 3:
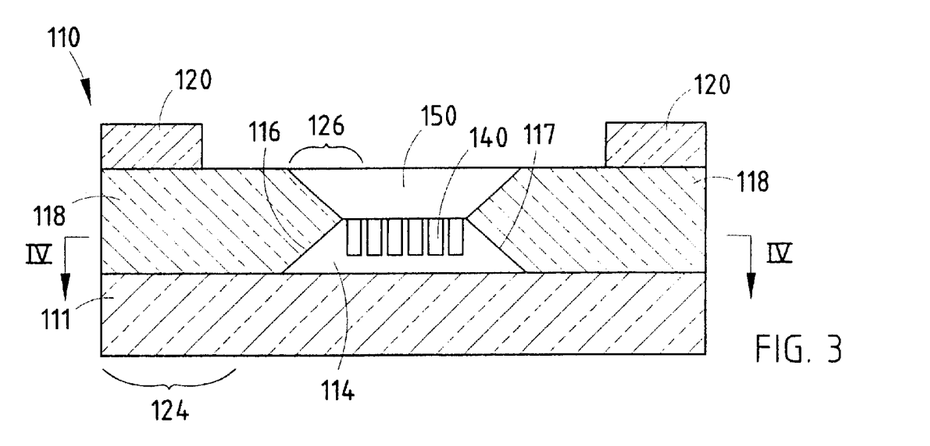
FIG. 3 is a schematic vertical cross-sectional view of another planar optical component embodying the invention.
Figure 4:
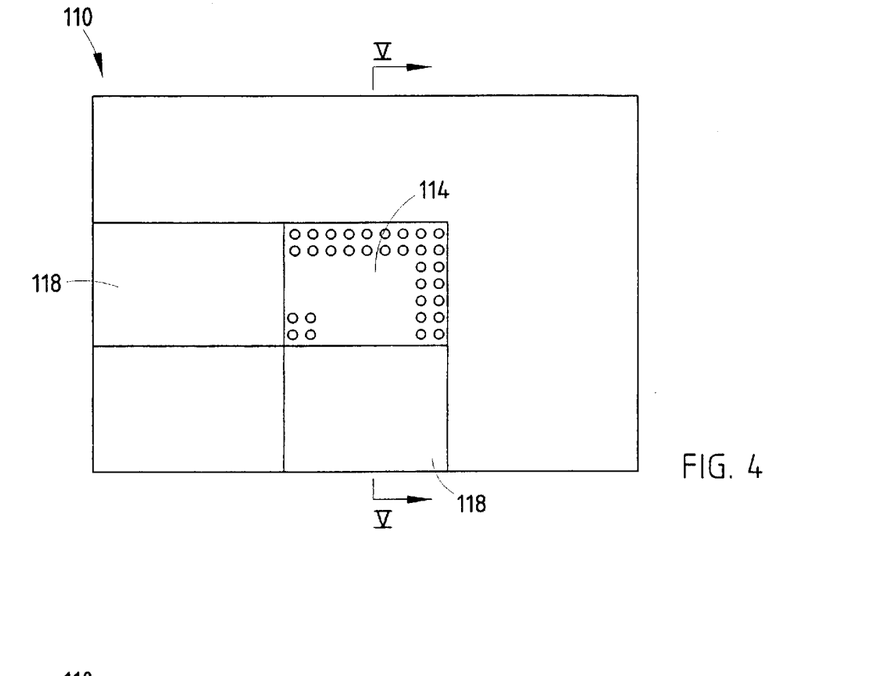
FIG. 4 is a schematic cross-sectional view taken along section line IV—IV of FIG. 3.

A two-dimensional photonic crystal component 110 embodying another aspect of this invention is shown in FIGS. 3 and 4. Component 110 includes a silica substrate 111 having a refractive index of 1.444 at a wavelength of 1,550 nanometers, a two-dimensional photonic crystal 114, and a low-refractive-index core layer 118 which has a refractive index of 1.449 at a wavelength of 1,550 nanometers. The space 150 above two-dimensional photonic crystal 114 is occupied by air, which has a refractive index of 1.0 and serves as an overcladding layer for crystal 114. Two-dimensional photonic crystal 114 is made of a high-refractive-index material such as crystalline silicon having a refractive index of 3.85 at a wavelength of 1,550 nanometers. Two-dimensional photonic crystals are well-known and have been employed in other fields such as microwave applications. A two-dimensional photonic crystal for bending light at a 90° angle in a very confined space is illustrated. Two-dimensional photonic crystal 114 comprises an array of holes 140 which each have a diameter of about one-quarter of the wavelength of the signal light (e.g., 1,550/4 nanometers), and are spaced apart from each other by a distance of about one-quarter of the wavelength of the signal light (e.g., 1,550/4 nanometers). Based on the pattern illustrated in FIG. 4, light exits two-dimensional photonic crystal 114 and component 110 in a direction 90° from the direction at which light enters component 110.

Figure 5:
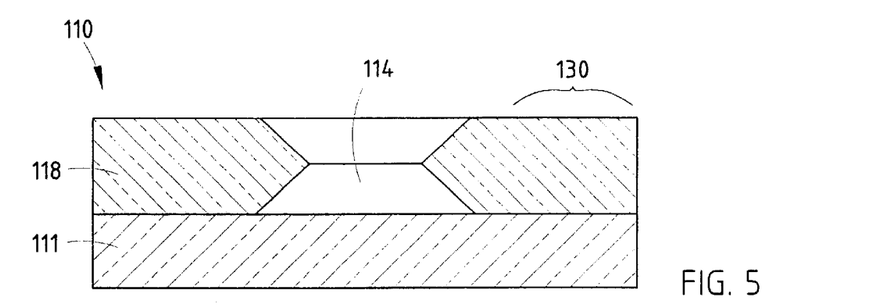
FIG. 5 is a schematic cross-sectional view taken along section line V—V of FIG. 4.

As with component 10, component 110 includes an input segment 124 defined by a low-refractive-index core 118 and cladding 111, a transition segment comprised of low-refractive-index core layer 118 and cladding layer 111, a transition segment 126 in which light is efficiently transferred from low-index core material 118 to high-index core material 114, a second transition segment 128 in which light is efficiently transferred from a high-refractive-index material of two-dimensional photonic crystal 114 to low-refractive-index material of core 118, and an output segment 130. The transition segments 126 and 128 include inclined or sloped interfaces between the low-refractive-index core material and the high-refractive-index core material that reduce reflective losses at the interfaces, and which allow input and output segments 124 and 130 that may have cross-sectional dimensions matching cross-sectional dimensions of standard optical fibers and other optical waveguides, thereby facilitating low-loss coupling of optical fibers to the input and outputs of component 110. The structure also facilitates input and output segments 124 and 130 having refractive indices for both core and cladding which may be closely matched with the refractive indices of the core and cladding of a standard optical fiber or other optical waveguide, thereby reducing reflective losses which would otherwise occur at an interface between an optical fiber and the input and/or output waveguide segments of an optical component having a high-refractive-index core material. Component 110 may include overcladding portions 120 at ends thereof to facilitate connection of a standard optical fiber.

Figure 6:
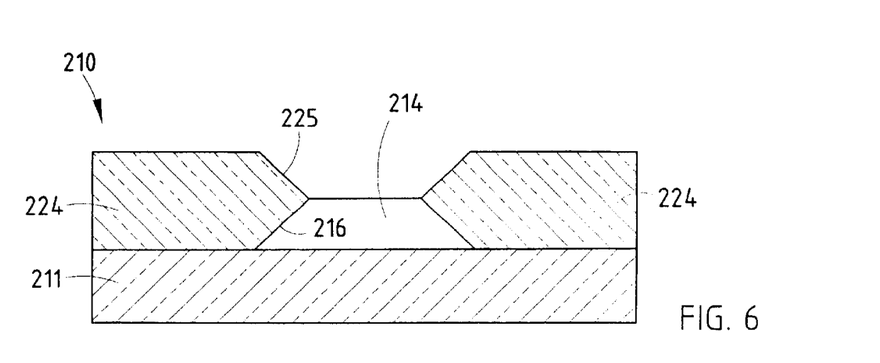
FIG. 6 is a schematic vertical cross-sectional view of a component similar to the component shown in FIGS. 3–5, which was used as a model for evaluating properties of the component as a function of its geometry.
Figure 7:
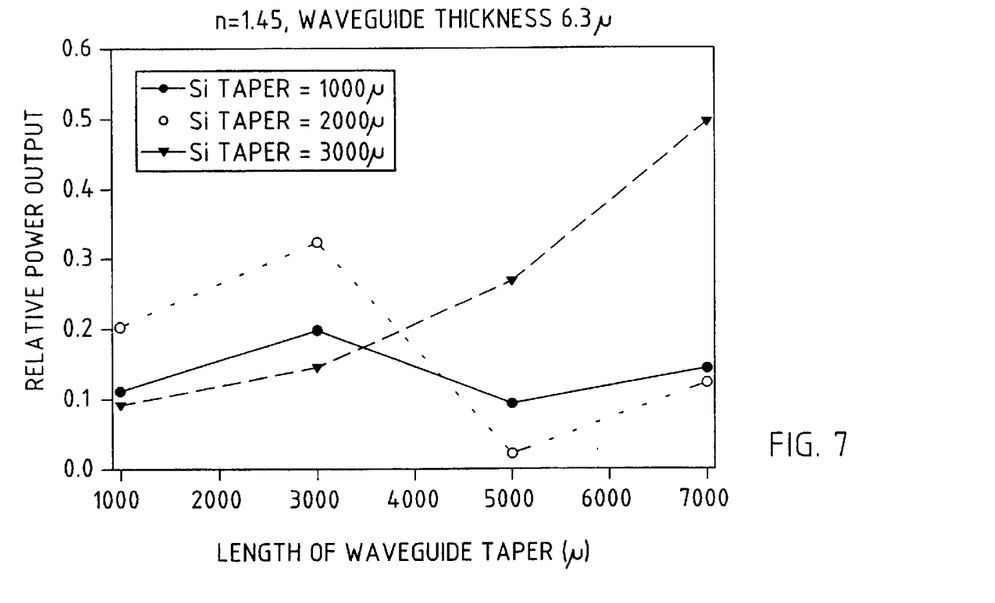
FIG. 7 is a graphic representation of the results of calculations used to determine properties of the component shown in FIG. 6 as a function of its geometry, namely the relative power output plotted against the length of the waveguide taper for n=1.45 and a waveguide thickness of $6.3\mu$.
Figure 8:
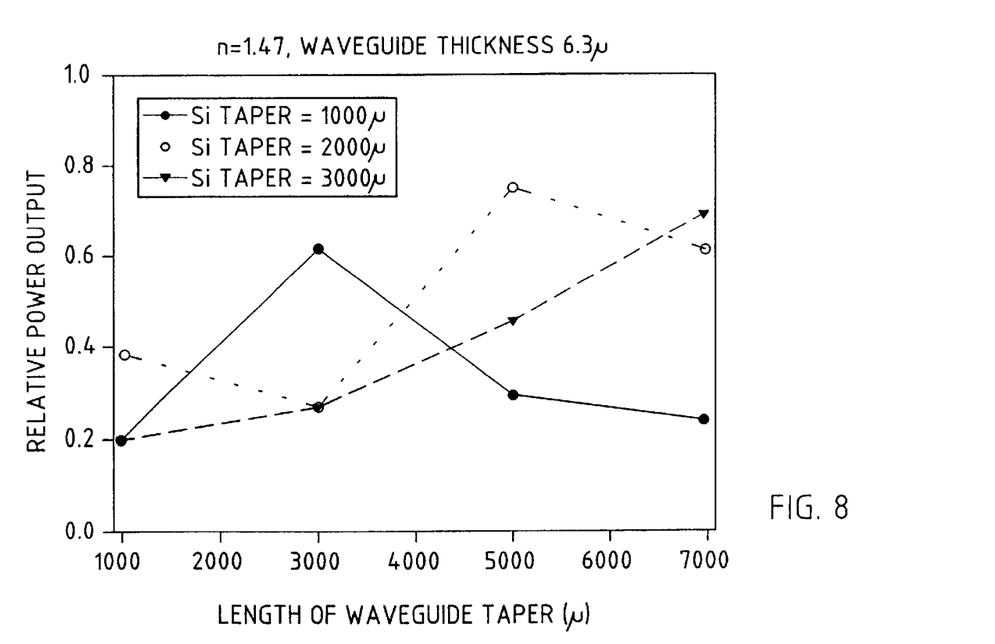
FIG. 8 is a graphic representation of the results of calculations used to determine properties of the component shown in FIG. 6 as a function of its geometry, namely the relative power output plotted against the length of the waveguide taper for n=1.47 and a waveguide thickness of $6.3\mu$.
Figure 9:
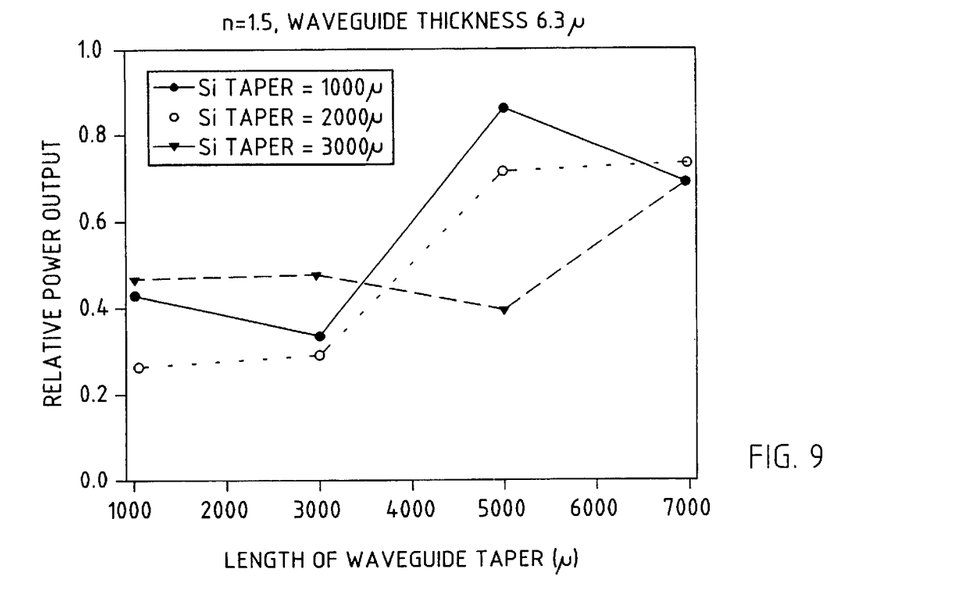
FIG. 9 is a graphic representation of the results of calculations used to determine properties of the component shown in FIG. 6 as a function of its geometry, namely the relative power output plotted against the length of the waveguide taper for n=1.5 and a waveguide thickness of $6.3\mu$.
Figure 10:
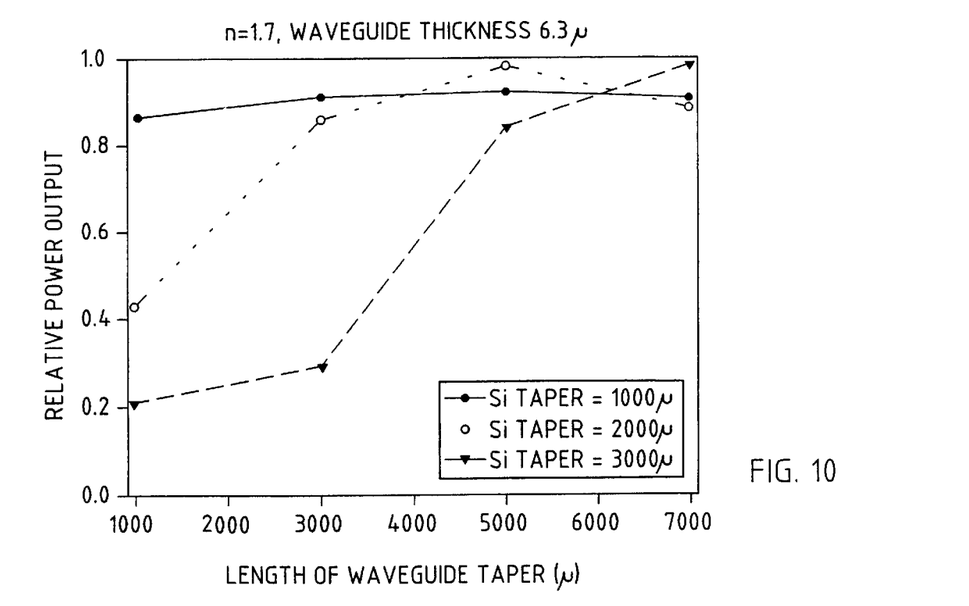
FIG. 10 is a graphic representation of the results of calculations used to determine properties of the component shown in FIG. 6 as a function of its geometry, namely the relative power output plotted against the length of the waveguide taper for n=1.7 and a waveguide thickness of $6.3\mu$.
Figure 11:
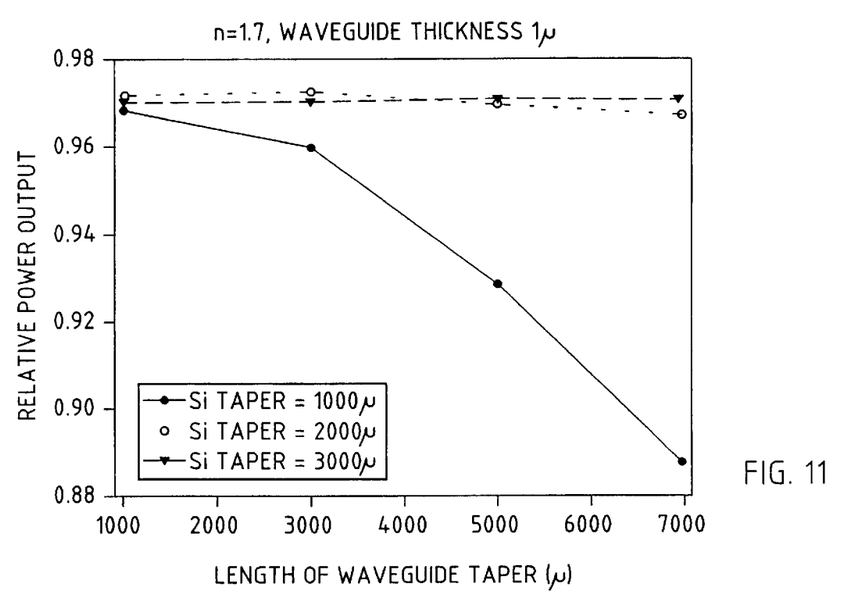
FIG. 11 is a graphic representation of the results of calculations used to determine properties of the component shown in FIG. 6 as a function of its geometry, namely the relative power output plotted against the length of the waveguide taper for n=1.7 and a waveguide thickness of $1\mu$.

FIG. 6 shows a component 210 similar to component 110, and which was used as a model for calculating properties of the component as a function of geometry. Component 210 includes a substrate 211 which acts as an undercladding having a thickness of 20 microns and a refractive index of 1.444. Calculations of taper length were done for photonic crystal tapers using conventional BeamProp™ software. The geometry used in the calculations is shown in FIG. 6. A silicon waveguide 214 was assumed to have a length of about 2,000 microns and a thickness of about 0.3 microns. The refractive index and the thickness of low-index waveguides 224 were varied. The length of both silicon waveguide taper 216 and low-refractive index waveguide taper 225 were varied. Four low-refractive index waveguides having the following refractive indices were considered: n=1.45, n=1.47, n=1.5 and n=1.7. The waveguide was assumed to have a height of 6.3 microns. Thus, the waveguide is multi-mode for n=1.47, n=1.5 and n=1.7, and single-mode for n=1.45. The results of the calculations are shown in FIGS. 7–11. It can be seen that, as the refractive index of the waveguide is raised, the loss is greatly decreased. The length of both the low-refractive index waveguide taper 225 and the length of the high-refractive-index (silicon) waveguide taper 216 are important. For example, if taper 216 is very long, and taper 225 is short, loss is very large. The minimum loss (power output 1 on y axis of the graph) with n=1.7 occurs when taper 216 is over 2,000 microns long, and when taper 225 is over 5,000 microns long. When the waveguide with n=1.7 was single-mode (thickness 1 micron), power output was independent of taper length for a silicon waveguide having a taper 216 greater than about 2,000 microns and a low-refractive-index waveguide taper 225 greater than about 1,000 microns. Based on the results, the length of the taper is preferably greater than 1,000 microns, and more preferably greater than 2,000 microns. The drawing figures are not to scale. In particular, the angle of the tapered interfaces are greatly exaggerated. For example, the angle between the upper surface of substrate 211 and the interface 116 would be about 3.4 minutes for a 1,000-micron-long interface when waveguide 214 is 1 micron thick.

The illustrated components 10 and 110 are only representative applications, other applications for the invention include, for example, electro-optic components in which a high refractive index core responsive to an electrical current are used for signal switching or attenuation. The principles of the invention may be advantageously employed in a variety of photonic components in which it is desirable to reduce signal losses at interfaces between core materials having a relatively high refractive index (e.g., about 1.45 or less).

It will become apparent to those skilled in the art that various modifications to the preferred embodiment of the invention as described herein can be made without departing from the spirit or scope of the invention as defined by the appended claims.

What is claimed is:

1. A planar optical component comprising:
a waveguide defining an optical path for propagating a light signal in a direction, the waveguide including a first waveguide segment having a first core material with a first refractive index, a second waveguide segment having a second core material with a second refractive index, a transition waveguide segment between the first waveguide segment and the second waveguide segment, the transition waveguide segment including the first core material and the second core material, the first core material and the second core material having an interface that is sloped at an acute angle relative to the direction of light propagated through the waveguide.

2. The planar optical component of claim 1 wherein the first refractive index is less than about 1.5 and the second refractive index is greater than about 1.5.

3. The planar optical component of claim 1 wherein the first core material and the second core material are independently selected from a group consisting of glass materials, crystalline materials, and ceramic materials.

4. The planar optical component of claim 1 wherein the first waveguide segment and second waveguide segment are further defined by a cladding material, and the difference between the refractive index of the first core material and the refractive index of the cladding material is from about 0.2% to about 2%, and the difference between the refractive index of the second core material and the cladding material is greater than about 2%.

5. The planar optical component of claim 1 wherein the length of the sloped interface is greater than about 1,000 microns.

6. The planar optical component of claim 1 wherein the length of the sloped interface is greater than about 2,000 microns.

7. A planar optical component comprising:
a waveguide defining an optical path for propagating a light signal in a direction, the waveguide including a first segment, a second segment and a transition segment disposed between the first segment and the second segment;

the first segment having a first core material with a refractive index that is about 1.5 or less;

the second segment having a second core material with a refractive index that is greater than about 1.5; and the transition segment including a core defined by both the first core material and the second core material, the first core material in the transition segment being contiguous with the first core material in the first segment, and having a cross-sectional dimension that decreases in a direction from the first segment to the second segment, the second core material in the transition segment being contiguous with the second core material in the second segment, and having a cross-sectional dimension that decreases in a direction from the second segment to the first segment, such that the first and second core materials in the transition segment define a sloped interface extending the length of the transition segment.

8. The planar optical component of claim 7 wherein the second refractive index is greater than about 1.7.

9. The planar optical component of claim 7 wherein the first core material and the second core material are independently selected from glass materials, crystalline materials, and ceramic materials.

10. The planar optical component of claim 7 in which the first segment, the second segment, and the transition segment further comprise a cladding, and wherein the difference between the refractive index of the first core material and the refractive index of the cladding is from about 0.2% to about 2%, and the difference between the refractive index of the second core material and the refractive index of the cladding is greater than about 2%.

11. The planar optical component of claim 10 wherein the difference between the refractive index of the second core material and the refractive index of the cladding is greater than about 10%.

12. The planar optical component of claim 7 wherein the length of the sloped interface is greater than about 1,000 microns.

13. The planar optical component of claim 7 wherein the length of the sloped interface is greater than about 2,000 microns.

14. The planar optical component of claim 7 wherein the interface between the first core material and the second core material in the transition segment is at an acute angle with respect to the direction in which light propagates through the waveguide.

15. A planar optical component comprising:

a waveguide defining an optical path for propagating a light signal in a direction, the waveguide including a first segment, a second segment, and a tapered transition segment disposed between the first segment and the second segment;

the first segment having a first core material and a cladding material in which the difference between the refractive index of the first core material and the refractive index of the cladding material is from about 0.2% to about 2%;

the second segment having a second core material and the cladding material in which the difference between the refractive index of the second core material and the refractive index of the cladding material is greater than about 2%; and the tapered transition segment including a contiguous mass of the first core material, a contiguous mass of the second core material, and the cladding material, the first contiguous mass and the second contiguous mass defining an interface extending the length of the transition segment.

16. The planar optical component of claim 15 wherein the first core material has a refractive index of about 1.45, the cladding material has a refractive index of about 1.44, and the second core material has a refractive index of at least about 1.7.

17. The planar optical component of claim 16 wherein the first core material, the second core material, and the cladding material are independently selected from glass materials, crystalline materials, and ceramic materials.

18. The planar optical component of claim 17 wherein the waveguide is disposed on a substrate.

19. The planar optical component of claim 18 wherein the substrate is silicon.

20. The planar optical component of claim 19 wherein the interface between the first core material and the second core material in the transition segment is at an acute angle with respect to the direction in which light propagates through the waveguide.

21. A method of coupling a light signal from an optical fiber to a first waveguide having a first core material with a first refractive index greater than about 1.7, the method comprising the steps of:

providing a planar optical component defining an optical path for propagating the light signal in a direction, the planar optical component including the first waveguide, a second waveguide having a second core material with a second refractive index less than about 1.5, and a transition waveguide located between the first waveguide and the second waveguide, the transition waveguide including a core material with the first refractive index and a core material with the second refractive index, the first core material and the second core material having an interface that is sloped at an acute angle relative to the direction of the light signal propagated through the planar optical component; and coupling the light signal from the optical fiber to the second waveguide segment.

22. The method of claim 21 wherein the first core material and the second core material are independently selected from glass materials, crystalline materials, and ceramic materials.

23. The method of claim 22 wherein the first segment, second segment, and transition segment further comprise a cladding, and wherein the difference between the refractive index of the first core material and the refractive index of the cladding is from about 0.2% to about 2%, and the difference between the refractive index of the second core material and the refractive index of the cladding is greater than about 2%.

24. The method of claim 22 wherein the difference between the refractive index of the second core material and the refractive index of the cladding is greater than about 10%.

25. The method of claim 21 wherein the length of the sloped interface is greater than about 1,000 microns.

26. The method of claim 21 wherein the length of the sloped interface is greater than about 2,000 microns.

* * * * *